(12) United States Patent
Jobson et al.

(10) Patent No.: US 12,257,923 B2
(45) Date of Patent: Mar. 25, 2025

(54) MANAGEMENT OF AN ENERGY STORAGE SYSTEM OF A VEHICLE

(71) Applicant: VOLVO TRUCK CORPORATION, Gothenburg (SE)

(72) Inventors: Edward Jobson, Gothenburg (SE); Hanna Bryngelsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 527 days.

(21) Appl. No.: 17/596,973

(22) PCT Filed: Jul. 1, 2019

(86) PCT No.: PCT/EP2019/067612
§ 371 (c)(1),
(2) Date: Dec. 22, 2021

(87) PCT Pub. No.: WO2021/001013
PCT Pub. Date: Jan. 7, 2021

(65) Prior Publication Data
US 2022/0234469 A1  Jul. 28, 2022

(51) Int. Cl.
*H02J 7/00* (2006.01)
*B60L 58/14* (2019.01)
(Continued)

(52) U.S. Cl.
CPC ............ *B60L 58/16* (2019.02); *B60L 58/14* (2019.02); *H01M 10/425* (2013.01);
(Continued)

(58) Field of Classification Search
CPC ...... B60L 58/14; B60L 58/16; B60L 2240/70; B60L 2250/16; B60L 2260/52; H01M 10/425; H01M 10/48; H01M 2010/4278
(Continued)

(56) References Cited

U.S. PATENT DOCUMENTS

2005/0040789 A1  2/2005 Salasoo et al.
2011/0270486 A1  11/2011 Stevens et al.
(Continued)

FOREIGN PATENT DOCUMENTS

CN    101354432 A    1/2009
CN    102612784 A    7/2012
(Continued)

OTHER PUBLICATIONS

International Search Report and Written Opinion dated Mar. 2, 2020 in corresponding International PCT Application No. PCT/EP2019/067612, 9 pages.
(Continued)

*Primary Examiner* — Zixuan Zhou
(74) *Attorney, Agent, or Firm* — Venable LLP; Jeffri A. Kaminski

(57) ABSTRACT

The present invention relates to a method of managing an energy storage system (ESS) of a vehicle, wherein the energy storage system has a beginning of life (BOL). The vehicle has at least a first application and a second application, and the energy storage system has a first end of life ($EOL_1$) for the first application and a second end of life ($EOL_2$) for the second application. Further, the ESS has a first lifetime between the BOL and the EOL and a second lifetime between the BOL and the $EOL_2$. The method comprises the steps of: a) determining energy and/or power requirement for the vehicle being in the first application; b) defining energy and/or power of the energy storage system at the beginning of life (BOL) of the energy storage system of the vehicle; c) determining a first state of health value $SOH_1$ at the first end of life ($EOL_1$) of the energy storage system of the vehicle being in the first application; d) determining energy and/or power requirement for the vehicle being in the second application; e) determining a
(Continued)

second state of health value $SOH_2$ at the second end of life ($EOL_2$) of the energy storage system if the vehicle is used in the second application.

13 Claims, 4 Drawing Sheets

(51) Int. Cl.
   *B60L 58/16* (2019.01)
   *H01M 10/42* (2006.01)
   *H01M 10/48* (2006.01)

(52) U.S. Cl.
   CPC ......... *H01M 10/48* (2013.01); *B60L 2240/70* (2013.01); *B60L 2250/16* (2013.01); *B60L 2260/52* (2013.01); *H01M 2010/4278* (2013.01)

(58) Field of Classification Search
   USPC .............................................. 320/109; 701/22
   See application file for complete search history.

(56) References Cited

U.S. PATENT DOCUMENTS

| | | |
|---|---|---|
| 2011/0313613 A1 | 12/2011 | Kawahara et al. |
| 2012/0191279 A1 | 7/2012 | Wippler |
| 2013/0027048 A1 | 1/2013 | Schwarz et al. |
| 2015/0239365 A1 | 8/2015 | Hyde et al. |
| 2016/0039295 A1 | 2/2016 | Madurai-Kumar et al. |
| 2018/0188332 A1* | 7/2018 | Newman ................ B60K 35/00 |
| 2019/0056234 A1* | 2/2019 | Lin ....................... G05D 1/0088 |
| 2019/0143832 A1 | 5/2019 | Birek et al. |

FOREIGN PATENT DOCUMENTS

| | | |
|---|---|---|
| CN | 106246391 A | 12/2016 |
| CN | 107074122 A | 8/2017 |
| CN | 107878218 A | 4/2018 |
| CN | 109405842 A | 3/2019 |
| DE | 102009042656 A1 | 3/2011 |
| DE | 102011005711 A1 | 9/2012 |
| DE | 102019112942 A1 | 11/2019 |
| EP | 3203574 A1 | 8/2017 |
| FR | 2965409 A1 | 3/2012 |
| WO | 2007048366 A1 | 5/2007 |

OTHER PUBLICATIONS

Chinese Office Action dated Dec. 22, 2023 in corresponding Chinese Patent Application No. 201980098119.8, 16 pages.

European Communication under Rule 71(3) EPC dated Feb. 1, 2024 in corresponding European Patent Application No. 19734808.9, 47 pages.

Chinese Office Action dated Jul. 10, 2024 in corresponding Chinese Patent Application No. 201980098119.8, 15 pages.

\* cited by examiner

MANAGEMENT OF AN ENERGY STORAGE SYSTEM OF A VEHICLE

CROSS-REFERENCE TO RELATED APPLICATIONS

This application is a U.S. National Stage application of PCT/EP2019/067612, filed Jul. 1, 2019, and published on Jan. 7, 2021, as WO 2021/001013 A1, all of which is hereby incorporated by reference in its entirety.

TECHNICAL FIELD

The invention relates to a method of managing an energy storage system (ESS) of a vehicle such that the lifetime of the ESS is maximized, and to system for managing an energy storage system (ESS) of a vehicle.

BACKGROUND

In the field of vehicles, there is a steady increase in research and development related to propulsion of vehicles with alternative power sources, i.e. power sources being used as alternatives to conventional internal combustion engines. In particular, electrically operated vehicles has emerged as a promising alternative.

According to the current state of art, a vehicle can be operated by means of an electric machine solely or by means of an arrangement comprising both an electric machine and an internal combustion engine. The latter alternative is often referred to as a hybrid vehicle (HEV), and can for example be utilized in a manner in which an internal combustion engine is used for operating the vehicle while driving outside urban areas whereas the electric machine can be used in urban areas or in environments in which there is a need to limit the discharge of harmful pollutants such as for example carbon monoxide and oxides of nitrogen.

The technology involved in electrically operated vehicles is closely related to the development of electrical energy storage systems. An electrical energy storage system may comprise at least one battery pack with a plurality of rechargeable battery cells which, together with control circuits, form a system which is configured for providing electric power to an electric machine in a vehicle. Vehicle batteries are continuously developed in order to e.g. be more durable both in terms of range and power, but also in terms of operational lifetime.

It is known that batteries degrade over time and that the expected driving range and fuel savings of a vehicle cannot be upheld towards the end of the lifetime of a battery due to a decreasing performance of the battery. Also, the decreasing performance will affect the magnitude of the power which can be received and supplied by the battery.

One important aspect in the field of ESS is to monitor the status of the battery. It is, for example, important to be aware of e.g. the utilization of the battery packs in order to know when it is time to replace the battery pack with a new one. State of Health (SOH) is often used in order to determine aging of the battery as a comparison between a new condition and a deteriorated condition.

US 2016/039295 describes a method for maximizing battery usage in a fleet of vehicles (par. [0017]-[0020]). The method of US 2016/039295 is implemented by a controller that analyses a number of parameters over time to determine a battery life estimation for the batteries. US 2016/039295 also teaches that battery life is highly dependent on a duty cycle of a vehicle, which is directly affected by the use of the vehicle.

Even though rechargeable batteries are capable of being repeatedly recharged and reused many times, it is still a fact that they have a limited lifetime. The point in time in which a battery approaches and finally reaches its "end of life" phase (EOL) can be said to correspond to a time when the performance requirements of the battery are no longer met.

Consequently, there is a need for systems and methods for optimizing the lifetime of a rechargeable battery while considering the fact that it will eventually degrade and reach its end of life. In other words, there is a need for a method of managing an energy storage system (ESS) of a vehicle such that the operational lifetime of the ESS is maximized.

SUMMARY

The present invention thus provides a method of managing an energy storage system (ESS) of a vehicle, the energy storage system having a beginning of life (BOL), the vehicle having at least a first application and a second application, the energy storage system having a first end of life ($EOL_1$) for the first application and a second end of life ($EOL_2$) for the second application, the ESS having a first lifetime between the BOL and the $EOL_1$ and a second lifetime between the BOL and the $EOL_2$, the method comprising the steps of:

a) determining energy and/or power requirement for the vehicle being in the first application;
b) defining energy and/or power of the energy storage system at the beginning of life (BOL) of the energy storage system of the vehicle;
c) determining a first state of health value $SOH_1$ at the first end of life ($EOL_1$) of the energy storage system of the vehicle being in the first application;
d) determining energy and/or power requirement for the vehicle being in the second application;
e) determining a second state of health value $SOH_2$ at the second end of life ($EOL_2$) of the energy storage system if the vehicle is used in the second application.

The term "energy storage system (ESS)" should in the following and throughout the entire description be interpreted as an electrical energy storage system comprising at least one battery pack with a plurality of rechargeable battery cells which, together with an electronic control unit (ECU), forms a system which may be used for electrical propulsion of a vehicle, and/or for providing electric power to auxiliary loads, such as air conditioning system, pneumatics, or the like. The voltage of the ESS may be 400-1000 V.

The ESS may also be arranged to power one or more internal auxiliary components commonly denoted as an auxiliary system of the vehicle. The auxiliary system can include several different components. One example of an auxiliary component is an air conditioning system.

According to the method of the present invention, SOH at the EOL of the energy storage system may be determined for any given application. Thus, the operational lifetime of the ESS may be maximized by choosing an application giving the highest SOH value.

The invention can be applied in any type of hybrid vehicles or electrical vehicles, such as partly or fully electrical vehicles. Although the invention will be described with respect to an electrical truck, the invention is not restricted to this particular vehicle, but may also be used in other hybrid or electrical vehicles such as electrical busses, electrical construction equipment, and electrical cars. The invention may also be applied in any other type of electrical vehicle such as electrical powered construction equipment, electrical working machines e.g. wheel loaders, articulated haulers, dump trucks, excavators and backhoe loaders etc.

The state of health of a battery can be calculated rather differently depending on the specific battery application, e.g. according to the equations (1) and (2) below. Various ways of calculating the state of health for a battery are well known to the person skilled in the art.

$$SOH_{power} = \frac{P_{req}}{P_{BOL}}, \quad (1)$$

wherein $P_{req}$ is requested power and $P_{BOL}$ is the power at the BOL of the ESS, and $$SOH_{energy} = \frac{E_{req}}{E_{BOL}} \quad (2)$$

wherein $E_{req}$ is required energy and $E_{BOL}$ is the energy at the BOL of the ESS.

The method disclosed above may be executed by a control unit, such as an electronic control unit (ECU). Such an ECU typically refers to a control unit of an ESS. The control unit may include a microprocessor, microcontroller, programmable digital signal processor or another programmable device. Thus, the control unit comprises electronic circuits and connections as well as processing circuitry such that the control unit can communicate with different parts of the electric power transmission system and any other parts in need of being operated in order to provide the functions of the example embodiments. Depending on the type of control unit and location of the control unit, the control unit may also be configured to communicate with other parts of the vehicle such as the electrical machines, brakes, suspension, the clutch, transmission and further electrical auxiliary devices, e.g. the air conditioning system, in order to at least partly operate the vehicle. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transitory memory for storing computer program code and data upon. Thus, the control unit may be embodied by many different constructions.

In other words, the control functionality of the example embodiments of the system for managing an energy storage system (ESS) may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While the example embodiments of the system for managing an energy storage system (ESS) described below can include a control unit being an integral part thereof, it is also possible that the control unit may be a separate part of the vehicle, and/or arranged remote from the system for managing an energy storage system (ESS) and in communication with the system for managing an energy storage system (ESS). The control unit may also include a model of one battery unit or a plurality of battery units, or a combination thereof. Thus, the energy storage system typically includes the control unit configured to control the functionality of the ESS. If the ESS comprises a battery pack assembly, the battery pack assembly may include the control unit configured to control the functionality of the battery pack assembly.

According to step a) of the method of the present invention, energy and/or power requirement for the vehicle being in the first application is determined. By the term "application" is meant a particular way in which a vehicle is used, such as a mission of the vehicle, a distance travelled by the vehicle during the route, charging opportunities along the route, duration of each charging event, weight, traffic situations, temperature, etc. By the term "mission" is meant the assignment performed by the vehicle, such as goods transport within urban areas, goods transport between urban areas, refuse handling, emergency rescue, tree transplanting, heavy haul or the like. In the case the vehicle is a bus, the mission may be public or private transportation means, mobile hospital, mobile library or the like.

Different applications of a vehicle require different energy and power of the ESS. Therefore, the capacity and power of the ESS that is allowed to fade over the lifetime of the ESS without affecting vehicle performance will be different for different applications. Hence, the lifetime for the same ESS will differ depending on the application of the vehicle.

Energy and/or power requirement for the vehicle being in the first application may be determined by recording energy and/or power use. The energy and/or power requirement may also be estimated based on the application. Alternatively, the energy and/or power requirement may be derived from the energy and/or power requirement of another vehicle being in the same first application. Step a) may be performed prior to putting the vehicle in the first application, or during operation of the vehicle in the first application.

It is understood that the vehicle may have further applications, such as e.g. a third application and a forth application.

According to step b) of the present invention, energy and/or power of the energy storage system at the beginning of life (BOL) of the energy storage system of the vehicle is defined. Usually, the energy and/or power of the ESS at the beginning of life (BOL) of the ESS is a predefined value provided by the manufacturer of the ESS. Alternatively, the energy and/or power of the energy storage system at the beginning of life (BOL) of the energy storage system may be determined by methods readily recognizable by the person skilled in the art.

In step c) of the method according to the present invention, a first state of health value $SOH_1$ at the first end of life ($EOL_1$) of said energy storage system of said vehicle being in said first application is determined. This may be done by any method known in the art and is not described in greater detail herein.

In the subsequent step d), energy and/or power requirement for the vehicle being in the second application is determined. In the context of the present invention, the second application is a particular way in which a vehicle is used being different from the first application.

According to step e), a second state of health value $SOH_2$ at the second end of life ($EOL_2$) of the energy storage system if the vehicle is used in the second application is determined.

Thus, by using the method of the present invention it is possible to estimate the SOH as well as the end of life of a vehicle depending on the application of the vehicle, and to assign a particularly advantageous application for the vehicle based on the SOH of the ESS such that the lifetime of the ESS is maximized. By using the method of the present invention, the application of the vehicle can be adapted based on the SOH/EOL values, thus avoiding premature change of batteries or unnecessary interruptions in the operation of the vehicle.

The method according to the present invention may further comprise the steps of:

f) communicating the $SOH_1$ and/or the $SOH_2$ of the ESS to the driver of the vehicle;

g) suggesting the first or the second application for the vehicle such that the lifetime of the energy storage system is maximized.

The driver of the vehicle may thus be alerted regarding the status of the battery depending on the application of the vehicle, and may make a decision to put the vehicle in another application such that the lifetime of the ESS is maximized. In other words, if $SOH_2$ is greater than $SOH_1$, the second application of the vehicle would result in a longer lifetime compared to the first application. Therefore, the driver may choose to put the vehicle in the second application in order to maximize the lifetime of the ESS.

Any of the at least first and second applications may have at least a first and a second operational mode. By the term "operational mode" is meant the conditions in which the vehicle being in a particular application is driven. An operational mode can thus be topographic variations, weather conditions, personal skills, mentality and mindset of the driver, or the like. The energy and/or power requirement may be estimated based on the operational mode of the vehicle.

The method according to the present invention is particularly useful if the vehicle is a part of a vehicle fleet being in communication with a central unit. The method of the present invention may then comprise the steps of:

h) communicating the $SOH_1$ and/or the $SOH_2$ of the ESS to the central unit;

i) identifying a vehicle group within the vehicle fleet, wherein the ESS of each of the vehicle in the vehicle group is approaching EOL;

j) suggesting an application for each of the vehicle in the vehicle group such that the lifetime of the energy storage system of each vehicle within the vehicle group is maximized.

In the context of the present invention, the term "vehicle fleet" means at least two, preferably at least five, more preferably at least 10 vehicles being in communication with a central unit. The central unit is arranged to receive information from each of the vehicles within the vehicle fleet. The information received by the central unit may relate to the global position of the vehicle as well as the internal parameters of the vehicle, such as temperature, battery status, weight, or the like. Each vehicle may receive information from the central unit, such as schedules, assignments or the like. The central unit may be operated by a fleet manager, such as a human or a computer.

The method of the present invention may be used by the fleet manager to optimize the fleet for the assignments that need to be accomplished. All the vehicles within the fleet report $SOH_1$ and $SOH_2$ values for their ESS to the central unit. A vehicle group is identified, wherein the ESS of each of the vehicle in the vehicle group is approaching EOL. The vehicle group may comprise at least two vehicles. The vehicles within the vehicle group may be in the same application. Alternatively, the vehicles within the vehicle group may be in different applications. As a final step, an application is suggested for each vehicle in the vehicle group, such that the lifetime of the energy storage system of each vehicle within the vehicle group is maximized. Steps i) and j) may be performed either by the ECU or by the fleet manager.

The present invention relates to a system for managing an energy storage system (ESS) of a vehicle, the energy storage system having a beginning of life (BOL), the vehicle having at least a first application and a second application, the energy storage system having a first end of life ($EOL_1$) for the first application and a second end of life ($EOL_2$) for the second application, the ESS having a first lifetime between the BOL and the $EOL_1$ and a second lifetime between the BOL and the $EOL_2$, the system comprising a control unit comprising one or more processors configured to:

determine energy and/or power requirement for the vehicle being in the first application;

define energy and/or power of the energy storage system at the beginning of life (BOL) of the energy storage system of the vehicle;

determine a first state of health value $SOH_1$ at the first end of life ($EOL_1$) of the energy storage system of the vehicle being in the first application;

determine energy and/or power requirement for the vehicle being in the second application;

determine a second state of health value $SOH_2$ at the second end of life ($EOL_2$) of the energy storage system if the vehicle is used in the second application.

The control unit is further configured to communicate the $SOH_1$ and/or the $SOH_2$ of the ESS to the driver of the vehicle; and to suggest the first or the second application for the vehicle such that the lifetime of the energy storage system is maximized.

As mentioned above, the vehicle being in any of the at least first and second applications may have at least a first and a second operational mode.

The steps of the method described above may be performed by a computer program comprising program code means when the program is run on a computer. The computer program may be stored on a computer readable medium.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Figure 1A:
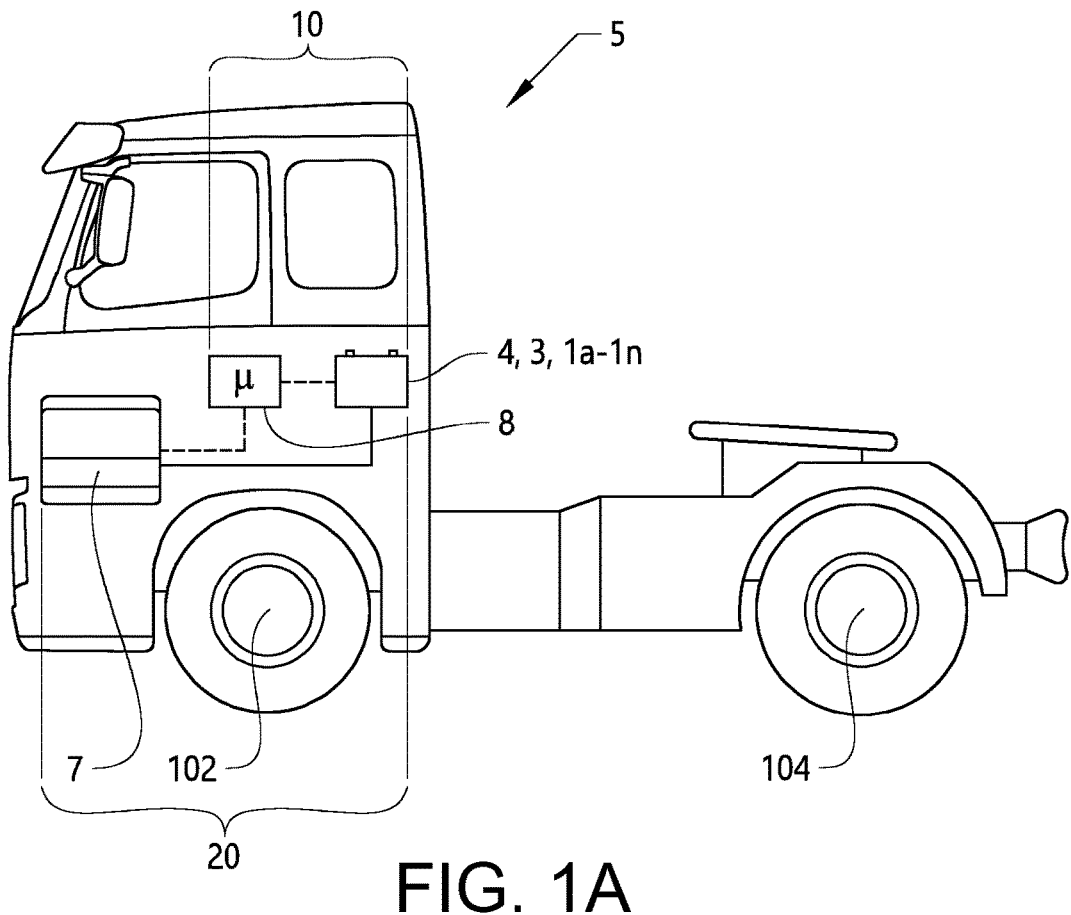
FIG. 1A is a side view of a vehicle in the form of an electrical truck, in which an energy storage system (ESS) operable by a method according to the present invention may be incorporated.

Referring now to the drawings and to FIG. 1A in particular, there is depicted an exemplary vehicle, here illustrated as an electrical truck 5. In this example, the electrical truck is a fully electrical vehicle. The electrical truck 5 comprises an electric propulsion system 20 configured to provide traction power to the vehicle. The electric propulsion system thus comprises an electrical energy storage system 10 and an electrical motor 7. The electrical energy storage system 10 is connected to the electrical motor 7 to provide power to the electrical motor, thereby the electrical motor can provide traction power to one or more ground engaging members, e.g. one or more wheels 102 and 104. It should be noted that the electric propulsion system can also be adapted to manage various types of electronic functions of the vehicle. The electric propulsion system 20 may of course be implemented, possibly in a slightly different way, in a bus 50 as shown in FIG. 1B, a car, or the like.

As mentioned above, the vehicle 5, 50 has at least a first application and a second application.

Figure 3:
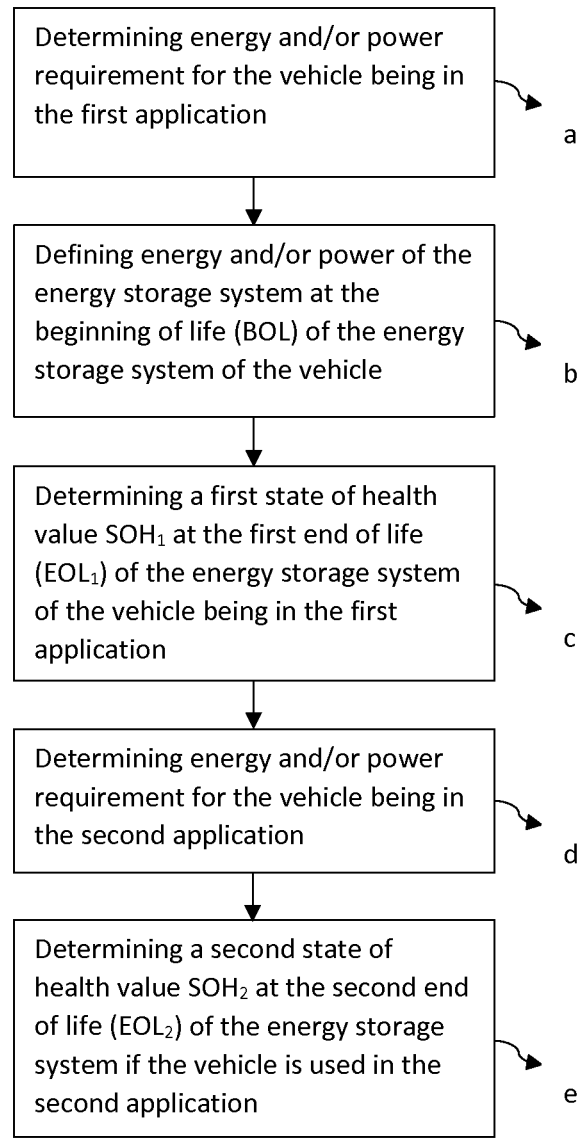
FIG. 3 is a flow-chart of a method according to an example embodiment of the invention, in which the method comprises a number of steps for controlling the energy storage system of the electric propulsion system in FIG. 2.
Figure 4:
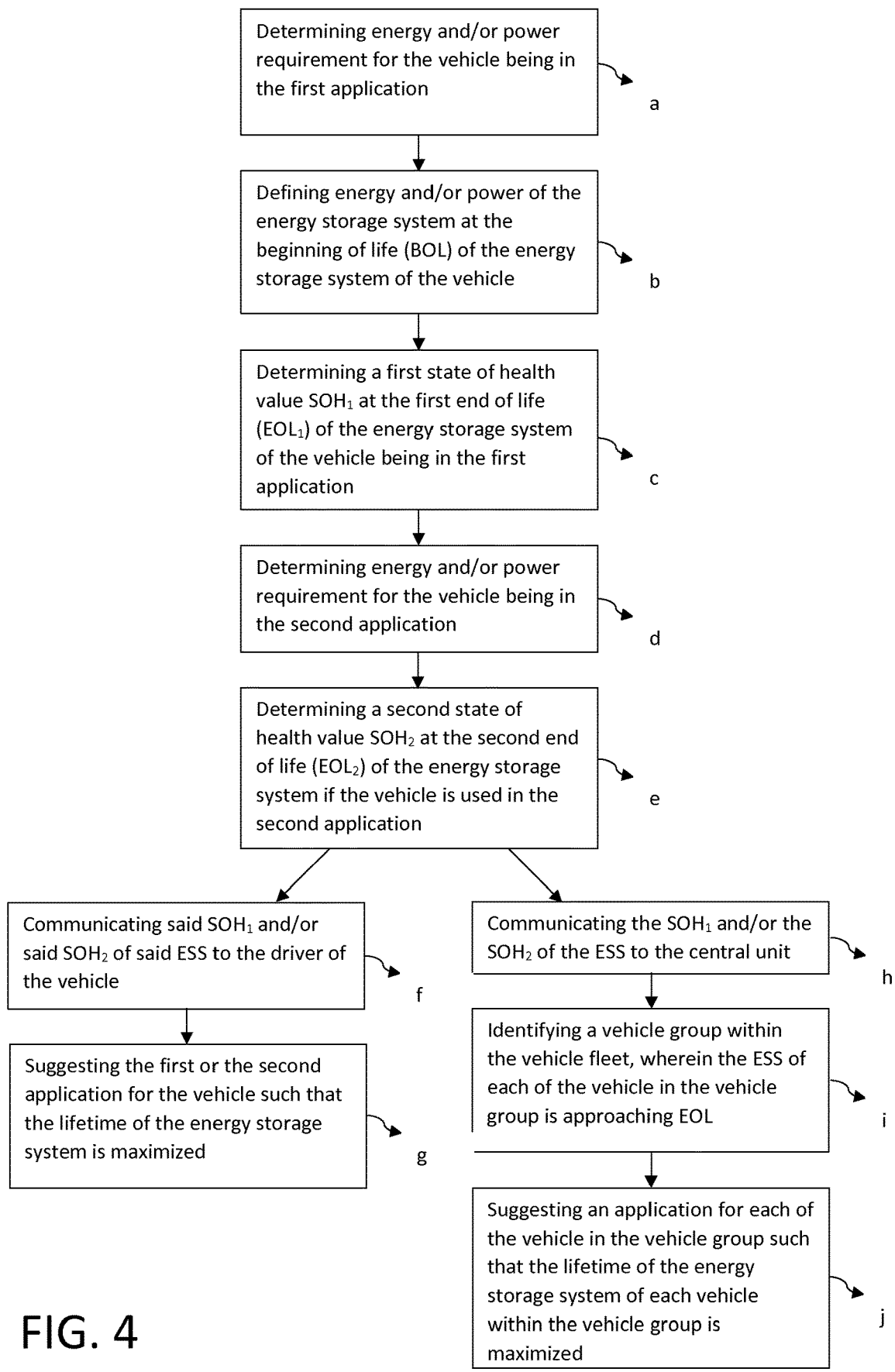
FIG. 4 is a flow-chart of additional steps of the method in FIG. 3 according to an example embodiment of the invention, in which the method comprises a number of steps for controlling the energy storage system of the electric propulsion system in FIG. 2.

The electric propulsion system is operable by a method according to any one of the example embodiments as described in any one of the FIGS. 3 and 4. As mentioned above, the electrical propulsion system 20 including the electrical motor(s) 7 is configured for driving the pair of ground engaging members 102, 104 in the form of wheels. Optionally, the electrical propulsions system 20 comprises a transmission (not shown) for transmitting a rotational movement from the electric motor(s) 7 to a propulsion shaft, sometimes denoted as the drive shaft (not shown). The propulsion shaft connects the transmission to the pair of wheel 102, 104. Furthermore, although not shown, the electrical motor 7 is typically coupled to the transmission by a clutch.

Figure 1B:
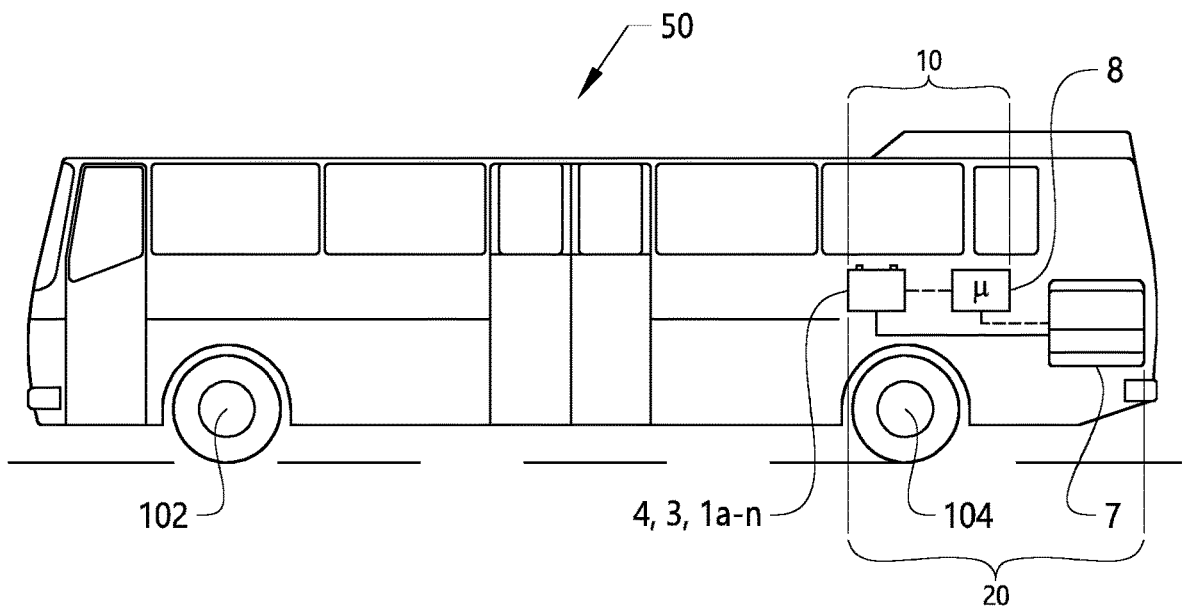
FIG. 1B is a side view of a vehicle in the form of an electrical bus, in which an energy storage system (ESS) operable by a method according to the present invention may be incorporated.
Figure 2:
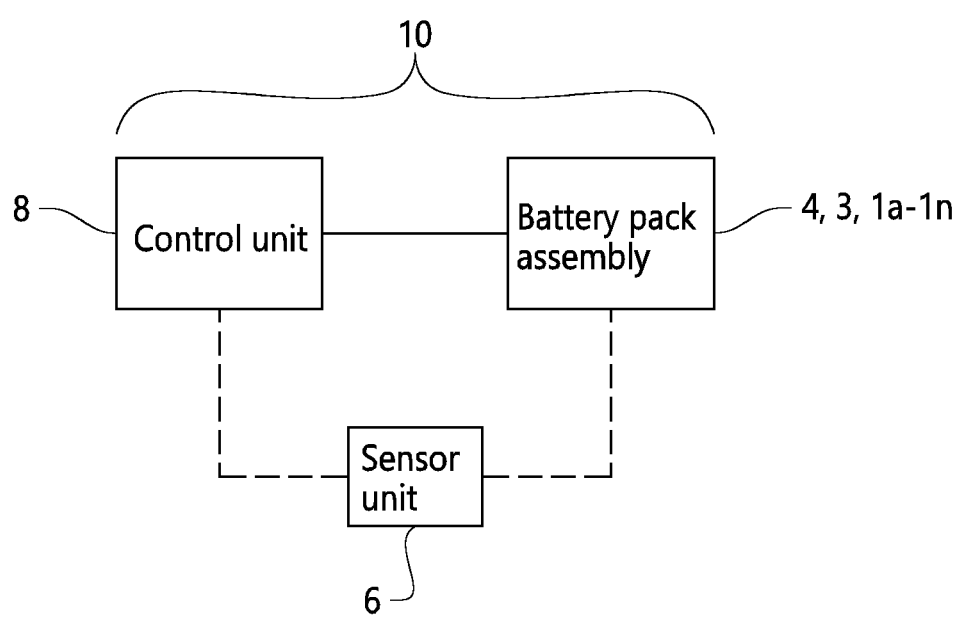
FIG. 2 schematically illustrates parts of an electric propulsion system comprised as a component of propulsion means for e.g. the vehicles shown in FIGS. 1A and 1B, in which the electrical propulsion system has an energy storage system (ESS) in the form of a battery unit assembly and a control unit for operating the ESS according to an example embodiment of the present invention.

One example embodiment of an ESS that may be incorporated in any one of the FIG. 1A and FIG. 1B is illustrated in FIG. 2. In particular, FIG. 2 schematically illustrates further details of the ESS 10 according to the example embodiment in FIG. 1A. The ESS is here a DC on-board energy storage system in the form of a battery pack assembly. In the following description of the example embodiments, the battery unit will sometimes be referred to as a battery pack and the battery unit assembly as a battery pack assembly. The battery pack assembly 4 is arranged to provide electrical power to the electrical motor (FIG. 1A), i.e. to provide propulsion for the electrical truck 5. The battery unit assembly 4 typically includes a plurality of battery units 1a to 1n. In the electrical energy storage system depicted in FIG. 1A, each battery unit 1a to 1n is a battery pack. In this context, the battery pack is a battery comprising a plurality of battery cells 3. As such, each one of the battery units 1a to 1n comprises a plurality of battery cells 3. To this end, the electrical energy storage system 10 comprises a multiple number of battery packs 1a to 1n connected to form the battery unit assembly 4. For instance, the battery pack assembly 4 may comprise seven battery packs. The number of battery packs in the battery pack system and the number of battery cells in each battery pack vary depending on the type of the vehicle, the type of installation, etc. In this example, the battery cells 3 are connected in series in each one of the battery packs 1a-1n. Further, the battery packs 1a-1n are generally connected in parallel.

By way of example, each one of the battery cells 3 is a lithium-ion battery.

The ESS 10 further comprises a control unit 8 configured to control and monitor the ESS 10. In this example, the control unit 8 is an electronic control unit. By way of example, the electronic control unit 8 is configured to operate the ESS 10 according to any one of the example embodiments of a method, as described in any one of the FIGS. 3 and 4.

Turning now to FIG. 3, there is depicted a flowchart of a method according to one embodiment of the invention. The method is intended for determining SOH at the EOL of the energy storage system for any given application. Thus, the operational lifetime of the ESS may be maximized by choosing an application giving the highest SOH value. The sequences of the method are typically performed by the control unit 8, as described above in relation to the FIGS. 1A, 1B and 2.

The method initially comprises step a), wherein energy and/or power requirement for the vehicle 5, 50 being in the first application is determined.

As mentioned above, energy and/or power requirement for the vehicle 5, 50 being in the first application may be determined by recording energy and/or power use. The energy and/or power requirement may also be estimated based on the application. Alternatively, the energy and/or power requirement may be derived from the energy and/or power requirement of another vehicle 5, 50 being in the same first application. Step a) may be performed prior to putting the vehicle 5, 50 in the first application, or during operation of the vehicle 5, 50 in the first application.

According to step b) of the present invention, energy and/or power of the energy storage system at the beginning of life (BOL) of the energy storage system 10 of the vehicle 5, 50 is defined. Usually, the energy and/or power of the ESS at the beginning of life (BOL) of the ESS is a predefined value provided by the manufacturer of the ESS. Alternatively, the energy and/or power of the energy storage system 10 at the beginning of life (BOL) of the energy storage system 10 may be determined by methods readily recognizable by the person skilled in the art.

In step c) of the method according to the present invention, a first state of health value $SOH_1$ at the first end of life ($EOL_1$) of the energy storage system 10 of the vehicle 5, 50 being in the first application is determined. This may be done by any method known in the art and is not described in greater detail herein.

In the subsequent step d), energy and/or power requirement for the vehicle 5, 50 being in the second application is determined.

By the way of example, the first application may be a long haul truck, and the second application may be a goods transport in urban areas.

According to step e), a second state of health value $SOH_2$ at the second end of life ($EOL_2$) of the energy storage system if the vehicle 5, 50 is used in the second application is determined.

By using the method of the present invention, information about $SOH_1$ and $SOH_2$ is provided and may be used for maximizing the life time of the ESS 10.

FIG. 4 depicts another embodiment of the method according to the present invention. In the embodiment shown in FIG. 4, the method comprises the steps a)-e) as described above.

According to the embodiment depicted in FIG. 4, the method further comprises the steps of:
f) communicating the $SOH_1$ and/or the $SOH_2$ of the ESS 10 to the driver of the vehicle 5, 50;
g) suggesting the first or the second application for the vehicle 5, 50 such that the lifetime of the energy storage system 10 is maximized.

The driver of the vehicle 5, 50 may thus be alerted regarding the status of the battery depending on the application of the vehicle 5, 50, and may make a decision to put the vehicle 5, 50 in another application such that the lifetime of the ESS is maximized. In other words, if $SOH_2$ is greater than $SOH_1$, the second application of the vehicle 5, 50 would result in a longer lifetime compared to the first application. Therefore, the driver may choose to put the vehicle 5, 50 in the second application in order to maximize the lifetime of the ESS 10.

As shown in FIG. 4, another embodiment of the method according to the present invention is feasible when the vehicle 5, 50 is a part of a vehicle fleet. The method according to the present invention is particularly useful if the vehicle 5, 50 is a part of a vehicle fleet being in communication with a central unit. The method of the present invention may then comprise the steps of:

h) communicating the $SOH_1$ and/or the $SOH_2$ of the ESS to the central unit;
i) identifying a vehicle group within the vehicle 5, 50 fleet, wherein the ESS of each of the vehicle 5, 50 in the vehicle group is approaching EOL;
j) suggesting an application for each of the vehicle 5, 50 in the vehicle group such that the lifetime of the energy storage system of each vehicle 5, 50 within the vehicle group is maximized.

The method of the present invention may be used by e.g. a fleet manager to optimize the fleet for the assignments that need to be accomplished. All the vehicles within the fleet report $SOH_1$ and $SOH_2$ values for their ESS to the central unit (step h). A vehicle group is identified, wherein the ESS of each of the vehicle 5, 50 in the vehicle group is approaching EOL (step i). The vehicle group may comprise at least two vehicles. The vehicles within the vehicle group may be in the same application. Alternatively, the vehicles within the vehicle group may be in different applications. As a final step, an application is suggested for each vehicle 5, 50 in the vehicle group, such that the lifetime of the energy storage system of each vehicle 5, 50 within the vehicle group is maximized. Steps i) and j) may be performed either by the ECU or by the fleet manager.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical truck, the invention should be understood to be equally applicable for any type of electrical vehicle, in particular an electrical bus, an electrical car or the like.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of managing an energy storage system (ESS) of a vehicle, said energy storage system having a beginning of life (BOL), said vehicle having at least a first application and a second application, said energy storage system having a first end of life ($EOL_1$) for said first application and a second end of life ($EOL_2$) for said second application, said ESS having a first lifetime between said BOL and said $EOL_1$ and a second lifetime between said BOL and said $EOL_2$, said method comprising the steps of:
a) determining energy and/or power requirement for said vehicle being in said first application;

b) defining energy and/or power of said energy storage system at the beginning of life (BOL) of said energy storage system of said vehicle;
c) determining a first state of health value $SOH_1$ at the first end of life ($EOL_1$) of said energy storage system of said vehicle being in said first application;
d) determining energy and/or power requirement for said vehicle being in said second application;
e) determining a second state of health value $SOH_2$ at the second end of life ($EOL_2$) of said energy storage system if said vehicle is used in said second application;
f) communicating said $SOH_1$ and/or said $SOH_2$ of said ESS to the driver of said vehicle;
g) suggesting to the driver said first or said second application for said vehicle such that said lifetime of said energy storage system is maximized by choosing the application giving the highest SOH value.

2. The method according to claim 1, wherein said vehicle being in any of said at least first and second applications has at least a first and a second operational mode.

3. The method according to claim 1, wherein said energy and/or power of said energy storage system at the beginning of life (BOL) of said energy storage system of said vehicle is a predefined value.

4. The method according to claim 1, wherein said energy and/or power requirement is determined by recording energy and/or power use.

5. The method according to claim 1, wherein said energy and/or power requirement is estimated based on said application.

6. The method according to claim 2, wherein said energy and/or power requirement is estimated based on said operational mode of said vehicle.

7. The method according to claim 1, wherein said steps a)-e) are performed either prior to or during operation of said vehicle.

8. A non-transitory computer readable medium carrying a computer program comprising program code for performing the steps of claim 1 when said program code is run on a computer.

9. A method of managing an energy storage system (ESS) of a vehicle, said energy storage system having a beginning of life (BOL), said vehicle being a part of a vehicle fleet in communication with a central unit, and said vehicle having at least a first application and a second application, said energy storage system having a first end of life ($EOL_1$) for said first application and a second end of life ($EOL_2$) for said second application, said ESS having a first lifetime between said BOL and said $EOL_1$ and a second lifetime between said BOL and said $EOL_2$, said method comprising the steps of:
a) determining energy and/or power requirement for said vehicle being in said first application;
b) defining energy and/or power of said energy storage system at the beginning of life (BOL) of said energy storage system of said vehicle;
c) determining a first state of health value $SOH_1$ at the first end of life ($EOL_1$) of said energy storage system of said vehicle being in said first application;
d) determining energy and/or power requirement for said vehicle being in said second application;
e) determining a second state of health value $SOH_2$ at the second end of life ($EOL_2$) of said energy storage system if said vehicle is used in said second application;
g) communicating said $SOH_1$ and/or said $SOH_2$ of said ESS to said central unit;
h) identifying a vehicle group within said vehicle fleet, wherein the ESS of the vehicles in said vehicle group are approaching EOL;
i) suggesting said at least first or second application for each vehicle in said vehicle group such that said lifetime of said energy storage system of each vehicle within said vehicle group is maximized by choosing the application giving the highest SOH value.

10. A system for managing an energy storage system (ESS) of a vehicle, said energy storage system having a beginning of life (BOL), said vehicle having at least a first application and a second application, said energy storage system having a first end of life ($EOL_1$) for said first application and a second end of life ($EOL_2$) for said second application, said ESS having a first lifetime between said BOL and said $EOL_1$ and a second lifetime between said BOL and said $EOL_2$, said system comprising a control unit comprising one or more processors configured to:
determine energy and/or power requirement for said vehicle being in said first application;
define energy and/or power of said energy storage system at the beginning of life (BOL) of said energy storage system of said vehicle;
determine a first state of health value $SOH_1$ at said first end of life ($EOL_1$) of said energy storage system of said vehicle being in said first application;
determine energy and/or power requirement for said vehicle being in said second application;
determine a second state of health value $SOH_2$ at said second end of life ($EOL_2$) of said energy storage system if said vehicle is used in said second application;
wherein said control unit is further configured to:
communicate said $SOH_1$ and/or said $SOH_2$ of said ESS to the driver of said vehicle;
suggest to the driver said first or said second application for said vehicle such that said lifetime of said energy storage system is maximized by choosing the application giving the highest SOH value.

11. The system according to claim 10, wherein said vehicle being in any of said at least first and second applications has at least a first and a second operational mode.

12. The system according to claim 10, wherein said energy and/or power of said energy storage system at the beginning of life (BOL) of said energy storage system of said vehicle is a predefined value.

13. A system for managing an energy storage system (ESS) of a vehicle, said energy storage system having a beginning of life (BOL), said vehicle being a part of a vehicle fleet in communication with a central unit, and said vehicle having at least a first application and a second application, said energy storage system having a first end of life ($EOL_1$) for said first application and a second end of life ($EOL_2$) for said second application, said ESS having a first lifetime between said BOL and said $EOL_1$ and a second lifetime between said BOL and said $EOL_2$, said system comprising a control unit comprising one or more processors configured to:
determine energy and/or power requirement for said vehicle being in said first application;
define energy and/or power of said energy storage system at the beginning of life (BOL) of said energy storage system of said vehicle;
determine a first state of health value $SOH_1$ at said first end of life ($EOL_1$) of said energy storage system of said vehicle being in said first application;

determine energy and/or power requirement for said vehicle being in said second application;

determine a second state of health value $SOH_2$ at said second end of life ($EOL_2$) of said energy storage system if said vehicle is used in said second application;

wherein said control unit is further configured to:

communicate said $SOH_1$ and/or said $SOH_2$ of said ESS to said central unit;

identify a vehicle group within said vehicle fleet, wherein the vehicles in said vehicle group are approaching EOL;

suggest said at least first or second application for each vehicle in said vehicle group such that said lifetime of said energy storage system of each vehicle within said vehicle group is maximized by choosing the application giving the highest SOH value.

\* \* \* \* \*